March 9, 1926.
C. C. FARMER
1,575,748
TRAIN SPEED CONTROL DEVICE
Filed June 5, 1924
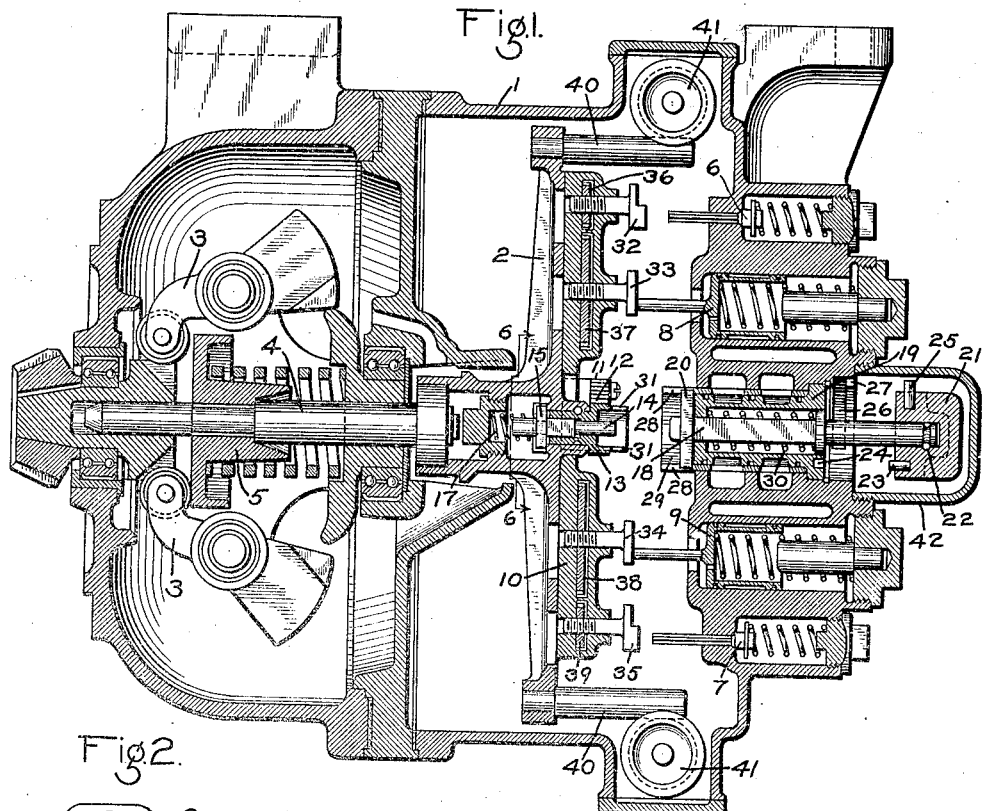
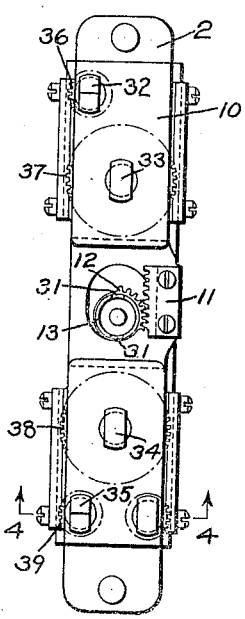
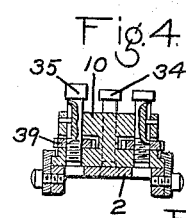
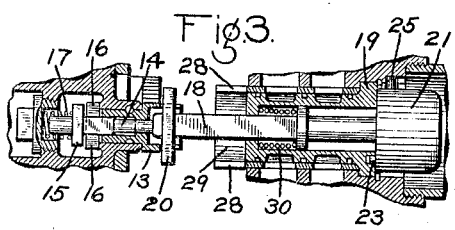
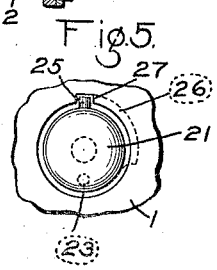
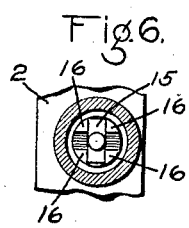
INVENTOR
CLYDE C. FARMER.
BY
*Wm. M. Cady*
ATTORNEY Patented Mar. 9, 1926.

1,575,748

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRAIN-SPEED-CONTROL DEVICE.

Application filed June 5, 1924. Serial No. 717,982.

*To all whom it may concern:*

Be it known that I, CLYDE C. FARMER, a citizen of the United States, residing at Pittsburgh, in the county of Allegheny and State of Pennsylvania, have invented new and useful Improvements in Train-Speed-Control Devices, of which the following is a specification.

This invention relates to automatic train speed control equipment, and more particularly to the centrifugal speed governor portion thereof.

It has heretofore been proposed to povide a train speed control equipment which includes a centrifugal governor and a plurality of valves adapted to be operated by the governor according to the speed of the train, the operation of each valve being adapted to limit the speed of the train to a speed dependent upon the particular valve which is operated, a speed control equipment of the above character being shown in the prior application of T. H. Thomas, Serial No. 531,676, filed January 25, 1922.

Where a locomotive is operated in both passenger and freight service, it is necessary that the speed control apparatus be provided with means whereby the train is controlled according to one range of speed limits when operating in passenger service and according to another and lower range of speed limits when the train is operating in freight service.

The principal object of my invention is to provide improved means for accomplishing the above purpose in which the same governor controlled valves are employed both for passenger and for freight service.

In the accompanying drawing; Fig. 1 is a central sectional view of a centrifugal governor speed control unit embodying my invention; Fig. 2 a face view of the governor operated cross-head; Fig. 3 a view of the manually controlled adjusting portion of the construction shown in Fig. 1, showing same when moved to its operating position; Fig. 4 a section on the line 4—4 of Fig. 2; Fig. 5 an end view of the manually controlled adjusting portion; and Fig. 6 a section on the line 6—6 of Fig. 1.

The centrifugal governor portion of the train speed control apparatus may comprise a casing 1 containing a speed governor, a cross-head 2 adapted to be operated by said governor and a plurality of valves adapted to be operated according to the movement of the cross-head 2.

The speed governor may comprise pivoted governor arms 3, a longitudinally movable spindle 4 operatively connected to cross-head 2, and a collar 5, carried by said spindle and adapted to be engaged and moved by the governor arms 3, in accordance with the speed of the governor.

The movement of cross-head 2 is adapted to operate any number of speed control valves, but for the purpose of illustration, I have shown a high speed valve 6, a medium speed valve 7 and blow down timing valves 8 and 9.

According to my invention, on the cross-head 2 is mounted a laterally movable slide 10. At an intermediate point, the slide 10 is provided with a rack bar 11, the teeth of which are adapted to mesh with the teeth of a gear segment 12.

The gear segment 12 is carried by an operating member 13, which is rotatably mounted in the cross-head 2. In order to lock the member 13 in either one of its operation positions, a locking device is provided comprising a longitudinally movable pin 14 having a squared portion which is mounted in the member 13, so that the locking device will turn with said member. Attached to pin 14 is a cross-bar 15 adapted to engage in either one of two recesses at right angles to each other and formed by lugs 16 on the cross-head 2. A spring 17 tends to maintain said cross-bar in its locking position in one of the recesses.

In axial alinement with the pin 14 is a manually operable device comprising a plunger 18 having a squared portion which is mounted to slide in a rotatable sleeve and valve member 19. A cross-bar 20 is secured to one end of the plunger 18, and the other end is provided with a manually operable knob 21. The knob 21 is secured to the plunger 18 by a pin 22 which is adapted to permit rotation of the knob without rotating the plunger 18. Said knob is provided with a pin 23 adapted to engage a recess 24 in the sleeve 19 when the knob is sufficiently depressed, and a pin 25 adapted to engage an extended recess 26 in the casing when the knob is depressed and the pin has entered the recess by way of slot 27.

The cross-bar 20 normally engages in slots 28 provided in bushing 29 and the plunger 18 is normally maintained in its non-operating position by spring 30.

When the plunger 18 is moved toward the left of the position shown in Fig. 1, the cross-bar 20 is adapted to engage slots 31 in the member 13 for the purpose of rotating same.

The sleeve 19 acts as a valve to connect one set of ports controlled by the timing valves 8 and 9 so that these valves operate as desired for freight service, when the sleeve 19 is in one position, and to connect another set of ports in another position when the valves are to operate in passenger service. Thus each timing valve operates both in freight and passenger service and a separate valve for each class of service is not required.

Mounted in the slide valve 10 are tappets 32, 33, 34, and 35, each adapted to engage the stems of the respective valve 6, 8, 9, and 7, and the tappets 32 and 35 are provided with two faces at different levels, so that when the slide 10 is shifted laterally, the stems of the corresponding valves will be in alinement with faces at the other level.

The stems of the tappets are screw-threaded to receive disks 36, 37, 38, and 39, said disks having their peripheries notched, so that the disks may be turned by the engagement of a screw driver or rod with the notches.

By rotating the disks, the tappets may be adjusted relatively to the valve stems, so that the tappets will engage the valve stems at the desired speed of the speed governor.

In order to guide and maintain the cross-head in the proper alinement, said cross-head may be provided with pins or guide rods 40 adapted to engage in grooves of rollers 41 which are pivotally mounted on the casing 1.

In Fig. 1, the speed governor unit is shown positioned or adjusted for freight service. If it is desired to set same for passenger service, the operator unscrews and removes the cap 42, so as to expose the knob 21. He then depresses the knob so that the pin 23 enters the recess 24 and the pin 25 passes through the slot 27. This movement causes the plunger 18 to be moved to the left so that the cross-bar 20 engages the slots 31 of the members 13.

The operator then rotates the knob 21 in a clockwise direction, so that the pin 25 travels in the recess 26 and the sleeve 19 is rotated and with the sleeve the plunger 18 and cross-bar 20. The cross-bar 20 being in engagement with the slots 31, the member 13 is rotated and thereby the rack bar 11, so that the slide 10 is shifted laterally to cause the lower faces of the tappets 32 and 35 to aline with the corresponding valve stems. When the speed governor is operating with the cross-head slide 10 adjusted to the above described position, it will be evident that higher governor speeds are necessary before the tappets will engage the valve stems to open the valves. When the sleeve 19 is rotated as above described, the set of ports of the timing valves 8 and 9 for freight service are cut out of service while the set of ports for passenger service are cut in.

The ports are held in their adjusted positions for passenger service by the engagement of the pin 25 in the recess 26 but when it is desired to again adjust the speed governor unit for freight service, the knob 21 is rotated in a counter clockwise direction, so that the member 13 is rotated and the slide 10 is moved back to the freight position, as shown in Fig. 1.

When in this position, the knob 21 may be released, when the spring 30 will shift the plunger 18 to the position shown in Fig. 1.

Having now described my invention, what I claim as new and desire to secure by Letters Patent, is:—

1. In a train control apparatus, the combination with a speed governor operated according to the speed of the train, of a plurality of valves, actuating means associated with said governor for operating said valves, and means for adjusting said actuating means to operate said valves at different train speeds.

2. In a train control apparatus, the combination with a speed governor operated according to the speed of the train, of a valve, a cross-head operable by said governor, a slide mounted in said cross-head, a tappet carried by said cross-head and provided with faces at different levels for engaging said valve, and means for adjusting said slide to bring different faces of said tappet into operating alinement with said valve.

3. In a train control apparatus, the combination with a speed governor operated according to the speed of the train, of a plurality of valves, a cross-head operated by said governor, a slide mounted in said cross-head, tappets carried by said slide and provided with faces at different levels for engaging said valves, and means for adjusting said slide to bring different faces of said tappets into operating alinement with said valves.

4. In a train control apparatus, the combination with a speed governor operated according to the speed of the train, of a valve, a cross-head associated with said governor, a movable member carried by said cross-head, a tappet mounted on said member for operating said valve, mechanism for adjusting said member, and a manually operable device movable to a position for actuating said mechanism.

5. In a train control apparatus, the combination with a speed governor operated according to the speed of the train, of a valve, a cross-head associated with said governor, a slide carried by said cross-head, a tappet mounted on said slide for operating said valve, mechanism including a slotted member for operating said slide, a plunger having means for engaging said slotted member, a spring tending to hold said plunger in its non-operating position, and means for locking said plunger in its operating position in engagement with said member.

6. In a train control apparatus, the combination with a speed governor operated according to the speed of the train, of a valve adjustable means operated by said governor for operating said valve, a plunger having means for operatively engaging said adjustable means, a rotatable sleeve in which said plunger is mounted, and a manually operated member associated with said plunger and movable to engage and rotate said sleeve and thereby said plunger.

7. In a train control apparatus, the combination with a speed governor operated according to the speed of the train, of speed control valves, means controlled by said governor for actuating said valves and a manually operated valve means having one position for establishing a fluid pressure communication to one valve for one class of service and another position for establishing a different fluid pressure communication for another class of service.

8. In a train control apparatus, the combination with a speed governor operated according to the speed of the train, of a valve operated both in high speed passenger and low speed freight service for controlling the speed of the train, means operated by said governor for operating said valve, and manual means for causing said valve to operate either as required for passenger service or as required for freight service.

In testimony whereof I have hereunto set my hand.

CLYDE C. FARMER.